United States Patent
Chung et al.

(10) Patent No.: US 9,146,430 B2
(45) Date of Patent: Sep. 29, 2015

(54) PIXEL STRUCTURE AND LIQUID CRYSTAL DISPLAY PANEL HAVING THE SAME

(71) Applicant: Au Optronics Corporation, Hsinchu (TW)

(72) Inventors: Jen-Yang Chung, Penghu County (TW);
Kun-Cheng Tien, New Taipei (TW);
Cheng Wang, Yilan County (TW);
Wei-Chun Wei, Taipei (TW);
Ming-Huei Wu, Yilan County (TW);
Shin-Mei Gong, Taoyuan County (TW);
Chien-Huang Liao, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 295 days.

(21) Appl. No.: 13/939,190

(22) Filed: Jul. 11, 2013

(65) Prior Publication Data

US 2014/0327852 A1    Nov. 6, 2014

(30) Foreign Application Priority Data

May 6, 2013   (TW) .............................. 102116109 A (51) Int. Cl.
*G02F 1/136*    (2006.01)
*G02F 1/1343*   (2006.01)
*G02F 1/1337*   (2006.01)
*G02F 1/137*    (2006.01)

(52) U.S. Cl.
CPC .... *G02F 1/134336* (2013.01); *G02F 1/133707* (2013.01); *G02F 2001/13775* (2013.01)

(58) Field of Classification Search
CPC ............ G02F 1/1368; G02F 1/136227; G02F 1/136286; G02F 2001/134345; G02F 1/133707; G02F 1/134336; G02F 1/1393; H01L 27/1214; H01L 27/12
USPC ............................................ 349/43, 144, 146
See application file for complete search history.

(56) References Cited

U.S. PATENT DOCUMENTS

| | | | |
|---|---|---|---|
| 6,952,252 B2 | 10/2005 | Nakanishi | |
| 7,372,533 B2 | 5/2008 | Inoue et al. | |
| 7,697,093 B2 * | 4/2010 | Chan et al. .................... | 349/110 |
| 8,471,990 B2 | 6/2013 | Chu et al. | |
| 2003/0086044 A1 | 5/2003 | Inoue et al. | |
| 2005/0253988 A1 | 11/2005 | Inoue et al. | |
| 2012/0162591 A1 | 6/2012 | Chu et al. | |

FOREIGN PATENT DOCUMENTS

| | | |
|---|---|---|
| CN | 101825798 | 9/2010 |
| CN | 102176092 | 9/2011 |
| TW | 567358 | 12/2003 |
| TW | 201227106 | 7/2012 |

* cited by examiner

*Primary Examiner* — Mike Qi
(74) *Attorney, Agent, or Firm* — Jianq Chyun IP Office (57) ABSTRACT

A pixel structure and a liquid crystal display (LCD) panel having the same are provided. The pixel structure includes a data line, a scan line, at least one active device, a pixel electrode, and a metal line. The active device is electrically connected to the data line and the scan line. The pixel electrode is electrically connected to the active device and has an opening at the edge of the pixel electrode adjacent to at least one of the data line and the scan line. The metal line is located below the pixel electrode. Besides, a portion of the metal line extending to the edge of the pixel electrode is exposed by the opening. The shortest distance between an edge of the opening of the pixel electrode and the metal line is greater than or substantially equal to 3 μm.

18 Claims, 8 Drawing Sheets

PIXEL STRUCTURE AND LIQUID CRYSTAL DISPLAY PANEL HAVING THE SAME

CROSS-REFERENCE TO RELATED APPLICATION

This application claims the priority benefit of Taiwan application serial no. 102116109, filed on May 6, 2013. The entirety of the above-mentioned patent application is hereby incorporated by reference herein and made a part of this specification.

BACKGROUND OF THE INVENTION

1. Field of the Invention

The invention relates to a pixel structure and a liquid crystal display (LCD) panel having the same; more particularly, the invention relates to a pixel structure to which a polymer stabilized alignment (PSA) technique is applied and an LCD panel having the pixel structure.

2. Description of Related Art

As the LCD technology continuously progresses in a direction of providing a large display screen, the market has been gravitating toward the LCDs characterized by high contrast ratio, rapid response, wide viewing angle, and so forth. Therefore, the wide viewing angle techniques of the LCD panels are continuously developed in order to overcome the viewing angle issue that occurs in the large LCD panels. The PSA technique is one of the existing wide viewing angle techniques commonly applied to the LCD panels. In a conventional PSA LCD panel, however, the edge of the pixel electrode is prone to encounter the problem of the disclination lines, which suffer the contrast and the transmittance of the LCD panel and further leads to the mura defect. Accordingly, how to develop a pixel structure with high transmittance and without disclination lines has entered into the consideration of researchers.

SUMMARY OF THE INVENTION

The invention is directed to a pixel structure and an LCD panel having the same. Here, the pixel structure has favorable transmittance and is not prone to encounter the problem of the disclination lines.

In an embodiment of the invention, a pixel structure that includes a data line, a scan line, at least one active device, a pixel electrode, and a metal line is provided. The active device is electrically connected to the scan line and the data line. The pixel electrode is electrically connected to the active device, and the pixel electrode has an opening at an edge of the pixel electrode adjacent to at least one of the data line and the scan line. The metal line is located below the pixel electrode. Here, a portion of the metal line extending to the edge of the pixel electrode is exposed by the opening, and the shortest distance between an edge of the opening of the pixel electrode and the metal line is greater than or substantially equal to 3 urn.

In an embodiment of the invention, another pixel structure that includes a data line, a scan line, at least one active device, a pixel electrode, and a metal line is provided. The active device is electrically connected to the scan line and the data line. The pixel electrode is electrically connected to the active device, and the pixel electrode has a close-ended opening at an edge of the pixel electrode adjacent to at least one of the data line and the scan line. The metal line is located below the pixel electrode, and a portion of the metal line extending to the edge of the pixel electrode is exposed by the close-ended opening. A width of the close-ended opening is wider than a width of the metal line, and a length of the portion of the metal line exposed by the close-ended opening is at least 3 um.

In an embodiment of the invention, an LCD panel that includes a first substrate, a second substrate, and a liquid crystal material is provided. The first substrate has a plurality of pixel structures, and each of the pixel structures is as described above. The second substrate is located opposite to the first substrate. The liquid crystal material is located between the first substrate and the second substrate, and the liquid crystal material correspondingly placed at the opening of the each pixel structures is tilted toward a center of the pixel structure.

As is discussed above, in the pixel structure and the LCD panel having the same, there is an opening at the edge of the pixel electrode adjacent to at least one of the scan line and the data line, and the portion of the metal layer extending to the edge of the pixel electrode is exposed by the opening. Hence, the liquid crystal material correspondingly arranged at the opening of the each pixel structures is not tilted toward the edge of the pixel structure. That is, in an embodiment of the invention, the liquid crystal material correspondingly arranged at the opening of each of the pixel structures is tilted toward the center of the pixel structure; thereby, the transmittance of the pixel structure is favorable, the issue of disclination lines is not apt to occur, and satisfactory display quality may be guaranteed.

Several exemplary embodiments accompanied with figures are described in detail below to further describe the invention in details.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

FIG. 1 to FIG. 5 are schematic top views illustrating a pixel structure according to a first embodiment of the invention.

Figure 1:
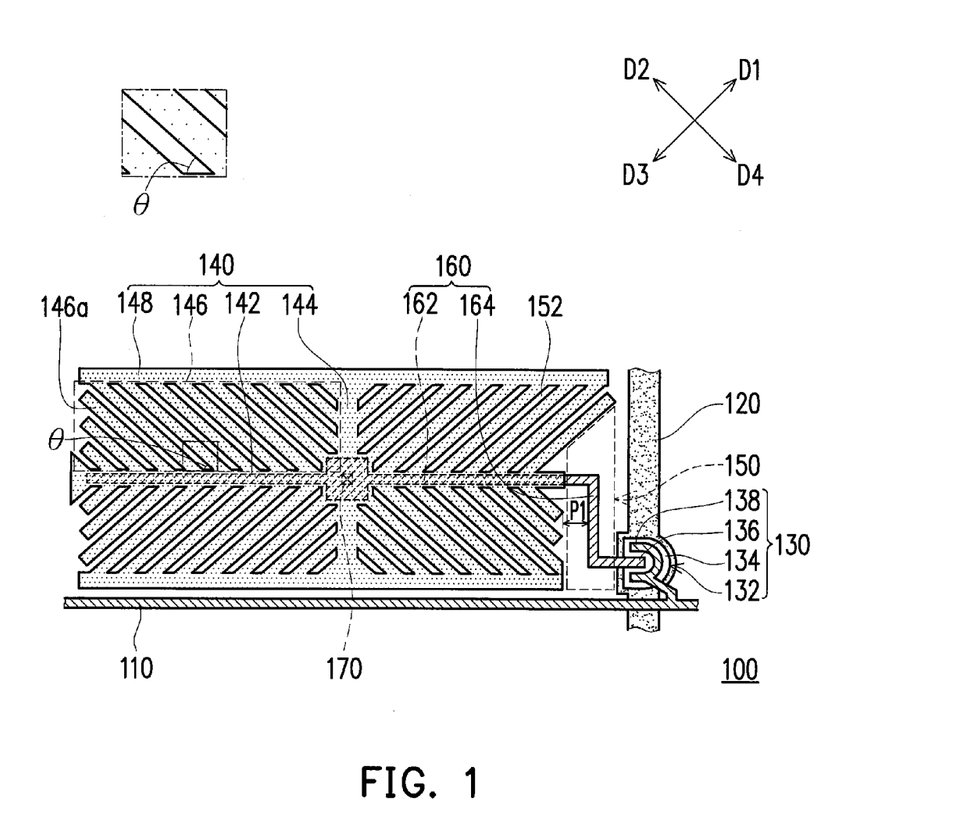
FIG. 1 to FIG. 5 are schematic top views illustrating a pixel structure according to a first embodiment of the invention.

With reference to FIG. 1, the pixel structure 100 described herein includes a data line 110, a scan line 120, at least one active device 130, a pixel electrode 140, a metal line 160, and a contact window 170.

Extension directions of the data line 110 and the scan line 120 are not the same; preferably, the extension directions of the data line 110 and the scan line 120 are perpendicular to each other. In addition, the scan line 120 and the data line 110 are located at different film layers, and an insulation layer (not shown) is sandwiched therebetween. The scan line 120 and the data line 110 serve to transmit driving signals for driving the pixel structure 100. In general, the data line 110 and the scan line 120 are made metal, which should however not be construed as a limitation to the invention. According to another embodiment, the scan line 120 and the data line 110 may be made of other conductive materials, such as an alloy, a metal nitride material, a metal oxide material, a metal oxynitride material, or a stacked layer constituted by metal and other conductive materials.

The active device 130 is electrically connected to the scan line 120 and the data line 110. Here, the active device T is a thin film transistor (TFT) that includes a gate 132, a channel layer 134, a drain 136, and a source 138. The gate 132 is electrically connected to the scan line 120, and the source 138 is electrically connected to the data line 110. That is, when a control signal is input to the scan line 120, the scan line 120 and the gate 132 are electrically connected to each other; when a control signal is input to the data line 110, the data line 110 and the source 138 are electrically connected to each other. The channel layer 134 is located above the gate 132 and below the source 138 and the drain 136. In the present embodiment, the active device 130 is a bottom-gate TFT, for instance, whereas the invention is not limited thereto. According to another embodiment of the invention, the active device 130 may also be a top-gate TFT. Besides, an insulation layer (not shown) is further formed on the gate 132 of the active device 130, and the insulation layer may be referred to as a gate insulation layer. Another insulation layer (not shown) may also be formed on the active device 130, and it is referred to as a passivation layer. These insulation layers are, for instance, made of an inorganic material, an organic material, or a combination thereof. The inorganic material includes silicon oxide, silicon nitride, silicon oxynitride, or a stacked layer where at least two of the above-mentioned materials are stacked.

The pixel electrode 140 is electrically connected to the active device 130. In the present embodiment, the pixel electrode 140 includes a main portion 142, a main portion 144, and a plurality of branch sets 146.

An extension direction of the main portion 142 is substantially parallel to that of the data line 110, and an extension direction of the main portion 144 is substantially parallel to that of the scan line 120. Preferably, the main portion 142 and the main portion 144 are perpendicular to each other.

Each of the branch sets 146 is connected to the main portion 142 and the main portion 144 and may include a plurality of branches 146a. Extension directions of the branches 146a are parallel. For instance, in an embodiment of the invention, the pixel electrode 140 has four branch sets 146 respectively extending along directions D1, D2, D3, and D4. The branches 146a extend outwardly from the main portion 142 or the main portion 144 to the four directions D1, D2, D3, and D4, and an included angle θ between the main portion 142 or the main portion 144 and each of the branches 146a is not equal to 90 degrees. Gaps between the branches 146a are also called alignment slits 152.

In the present embodiment, the pixel electrode 140 further includes a plurality of side portions 148 arranged at the ends of the branch sets 146 of the pixel electrode 140. Although the side portions 148 may be located at the ends of some of or all of the branch sets 146 of the pixel electrode 140, the use of the side portions 148 is not required in the invention. That is, in another embodiment, the side portions 148 of the pixel electrode 140 may be omitted.

In the invention, the pixel electrode 140 has an opening 150 at an edge of the pixel electrode 140 adjacent to the data line 110 and the scan line 120. In the embodiment shown in FIG. 1, the opening 150 is adjacent to the data line 110 and the scan line 120 and is an open-ended opening, for instance. However, the invention is not limited thereto, and in another embodiment, the opening 150 may be adjacent to at least one of the data line 110 and the scan line 120. For instance, the opening 150 may be adjacent to the data line 110 or adjacent to the scan line 120.

The metal line 160 is located below the pixel electrode 140, and a portion of the metal line 160 extending to the edge of the pixel electrode 140 (e.g., the edge of the pixel electrode 140 adjacent to at least one of the data line 110 and the scan line 120) is exposed by the opening 150. Particularly, the metal line 160 includes a first portion 162 and a second portion 164 that are perpendicular to each other. The first portion 162 is correspondingly located below the main portion 142 of the pixel electrode 140. The second portion 164 is correspondingly located at the opening 150 of the pixel electrode 140 and is thus exposed by the opening 150.

Note that the shortest distance P1 between the edge of the opening 150 of the pixel electrode 140 and the metal line 164 is greater than or substantially equal to 3 μm and is less than 10 μm. Preferably, the shortest distance P1 is greater than or substantially equal to 5 μm and is less than 10 μm. In the event that the shortest distance P1 is excessively short, the problem of the disclination lines may still occur. By contrast, on the condition that the shortest distance P1 is excessively long, the area of the transmission is reduced, such that the aperture ratio is lowered down. Hence, the properly determined shortest distance P1 between the edge of the opening 150 and the metal line 164 prevents the problem of disclination lines from occurring at the edge of the pixel electrode 140, improves the transmittance, and ameliorates the display quality.

Besides, in an embodiment of the invention, the metal line 160 is electrically connected to the drain 136 of the active device 130. However, the invention is not limited thereto, and in another embodiment of the invention, the metal line 160 may be electrically connected to a capacitor electrode or another device.

The contact window 170 is located at the intersection between the main portion 142 and the main portion 144 of the pixel electrode 140, such that the contact window 170 is electrically connected to the metal line 160 and the pixel electrode 140. Moreover, in an embodiment of the invention, the metal line 160 is electrically connected to the drain 136 of the active device 130 and the pixel electrode 140. Hence, the pixel electrode 140 is electrically connected to the active device 130. Specifically, the pixel electrode 140 may be electrically connected to the drain 136 of the active device 130 through the contact window 170.

FIG. 2 to FIG. 5 are schematic top views illustrating a pixel structure according to the first embodiment of the invention. The embodiment shown in FIG. 2 to FIG. 5 are similar to the embodiment shown in FIG. 1, and therefore identical components in these figures will be denoted with the same numerals and will not be further described hereinafter.

Figure 2:
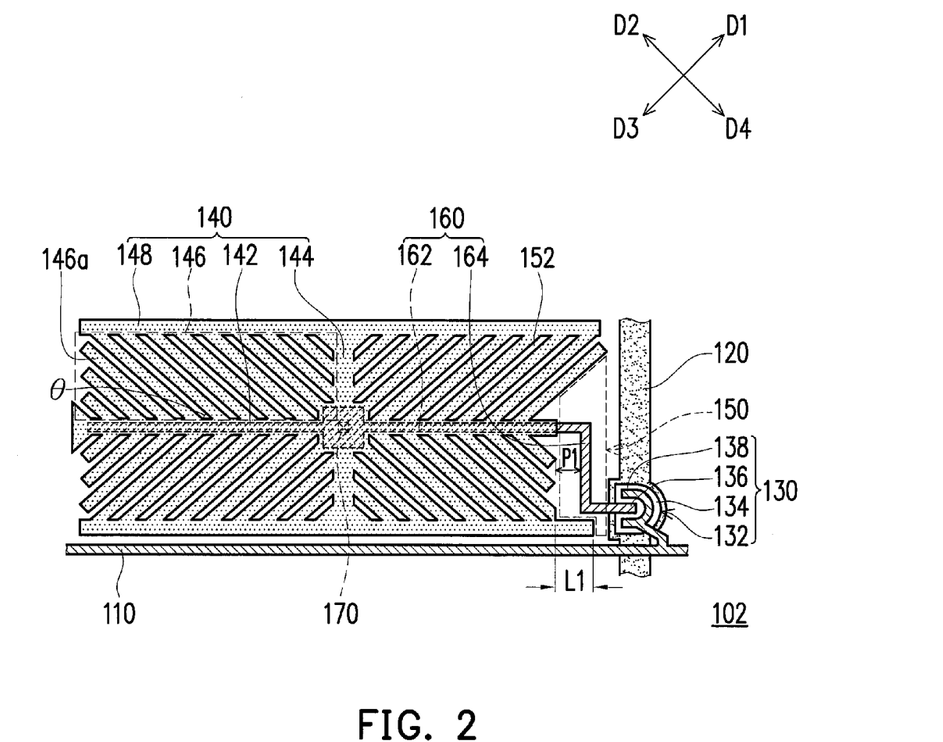

The difference between the embodiment shown in FIG. 2 and the embodiment shown in FIG. 1 lies in that the side portions 148 of the pixel electrode 140 are further extended by a distance around the opening 150 and the data line 110, and the length of said distance is L1. Thereby, the shape of the open-ended opening 150 herein is different from that of the opening 150 shown in FIG. 1.

Figure 3:
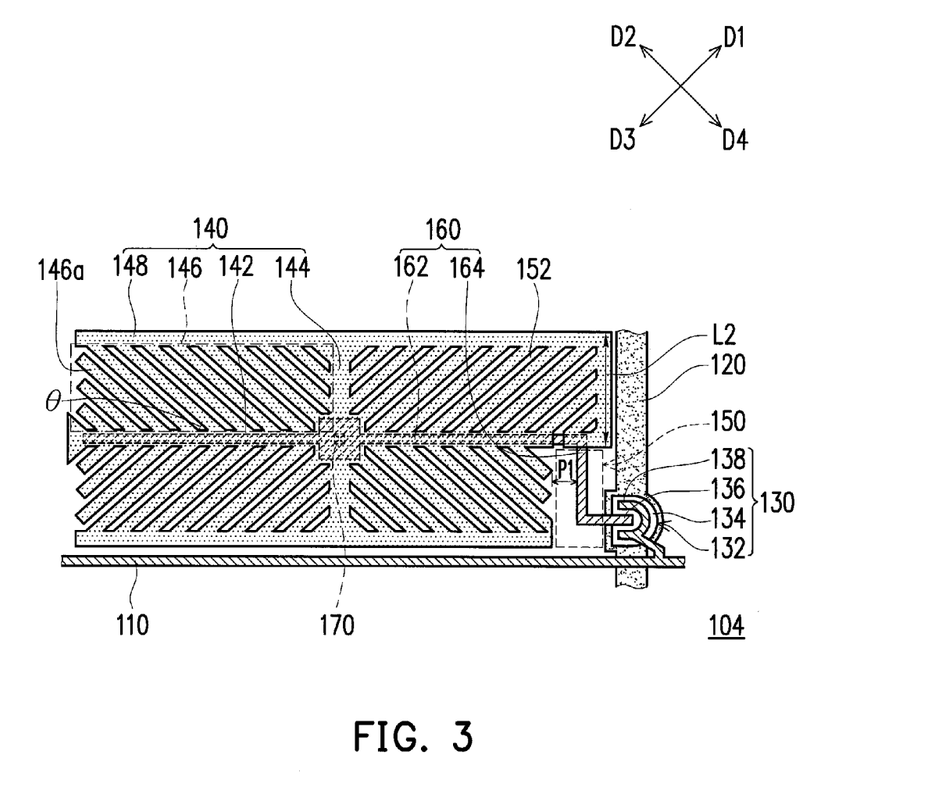

The difference between the embodiment shown in FIG. 3 and the embodiment shown in FIG. 1 lies in that the area occupied by the opening 150 of the pixel electrode 140 is relatively small, and the side portions 148 of the pixel electrode 140 are further extended by a distance around the opening 150 and the scan line 120. The length of said distance is L2, and the extended part is connected to the branch sets 146. In FIG. 3, some of the side portions and some of the branch sets 146 at the opening 150 of the pixel electrode 140 are omitted; that is, the pixel electrode 140 located at two sides of the main portion 142 is not symmetrical. Thereby, the shape of the open-ended opening 150 herein is different from that of the opening 150 shown in FIG. 1.

Figure 4:
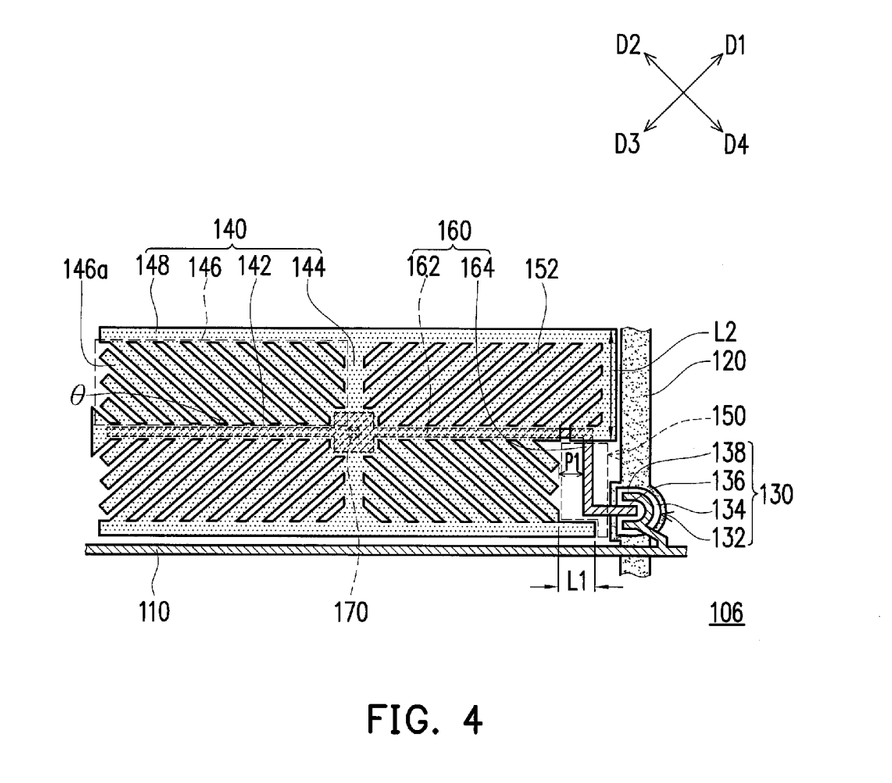

The difference between the embodiment shown in FIG. 4 and the embodiment shown in FIG. 1 lies in that the area occupied by the opening 150 of the pixel electrode 140 is relatively small, and the side portions 148 of the pixel electrode 140 are further extended by a distance around the opening 150 and the scan line 120. The length of said distance is L2, and the extended part is connected to the branch sets 146. In FIG. 4, some of the side portions and some of the branch sets 146 at the opening 150 of the pixel electrode 140 are omitted; that is, the pixel electrode 140 located at two sides of the main portion 142 is not symmetrical. Besides, the side portions 148 of the pixel electrode 140 are further extended by a distance around the opening 150 and the data line 110, and the length of said distance is L1. Thereby, the shape of the open-ended opening 150 herein is different from that of the opening 150 shown in FIG. 1.

Figure 5:
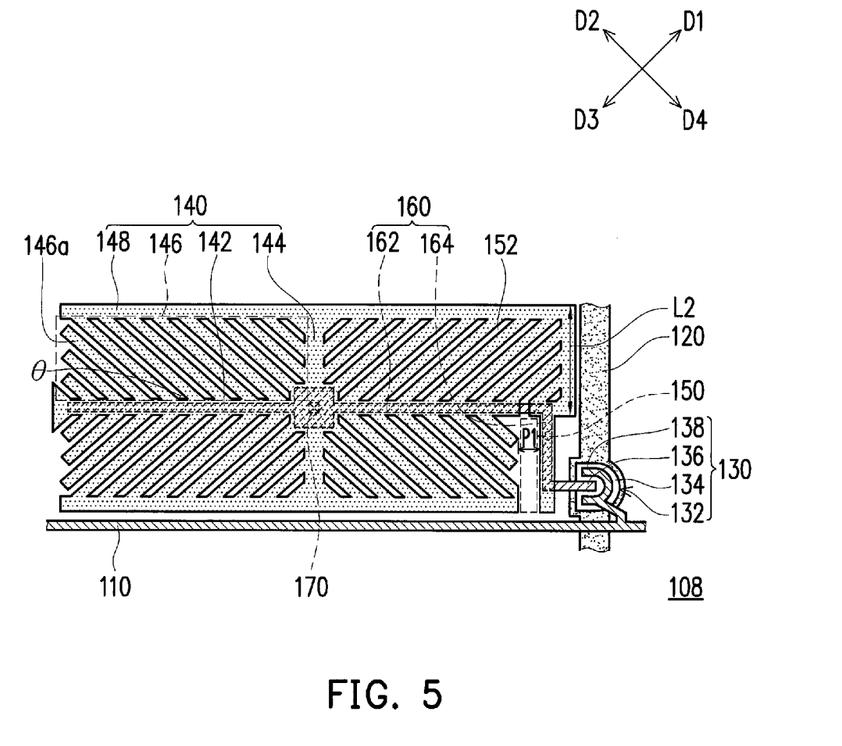

The difference between the embodiment shown in FIG. 5 and the embodiment shown in FIG. 1 lies in that the pixel electrode 140 is located right above and partially covers the metal line 162, the area occupied by the opening 150 of the pixel electrode 140 is relatively small, and the side portions 148 of the pixel electrode 140 are further extended by a distance around the opening 150 and the scan line 120. The length of said distance is L2, and the extended part is connected to the branch sets 146. In FIG. 5, some of the side portions and some of the branch sets 146 at the opening 150 of the pixel electrode 140 are omitted; that is, the pixel electrode 140 located at two sides of the main portion 142 is not symmetrical. Thereby, the shape of the open-ended opening 150 herein is different from that of the opening 150 shown in FIG. 1.

In the embodiment shown in FIG. 2 to FIG. 5, note that the shortest distance P1 between the edge of the opening 150 of the pixel electrode 140 and the metal line 164 is greater than or substantially equal to 3 μm and is less than 10 μm. Preferably, the shortest distance P1 is greater than or substantially equal to 5 μm and is less than 10 μm. In the event that the shortest distance P1 is excessively short, the problem of disclination lines may still occur. By contrast, on the condition that the shortest distance P1 is excessively long, the transmission area is reduced, such that the aperture ratio is lowered down. Hence, the properly determined shortest distance P1 between the edge of the opening 150 and the metal line 164 prevents the problem of disclination lines from occurring at the edge of the pixel electrode 140, improves the transmittance, and ameliorates the display quality.

The embodiment shown in FIG. 1 to FIG. 5 provide several exemplary shapes of the open-ended opening 150 at the edge of the pixel electrode 140, which should however not be construed as limitations to the invention. In another embodiment of the invention, the open-ended opening 150 may be shaped in a different manner, as long as the opening 150 is able to expose the portion of the metal line 160 extending to the edge of the pixel electrode 140 adjacent to at least one of the scan line 120 and the data line 110.

Figure 6:
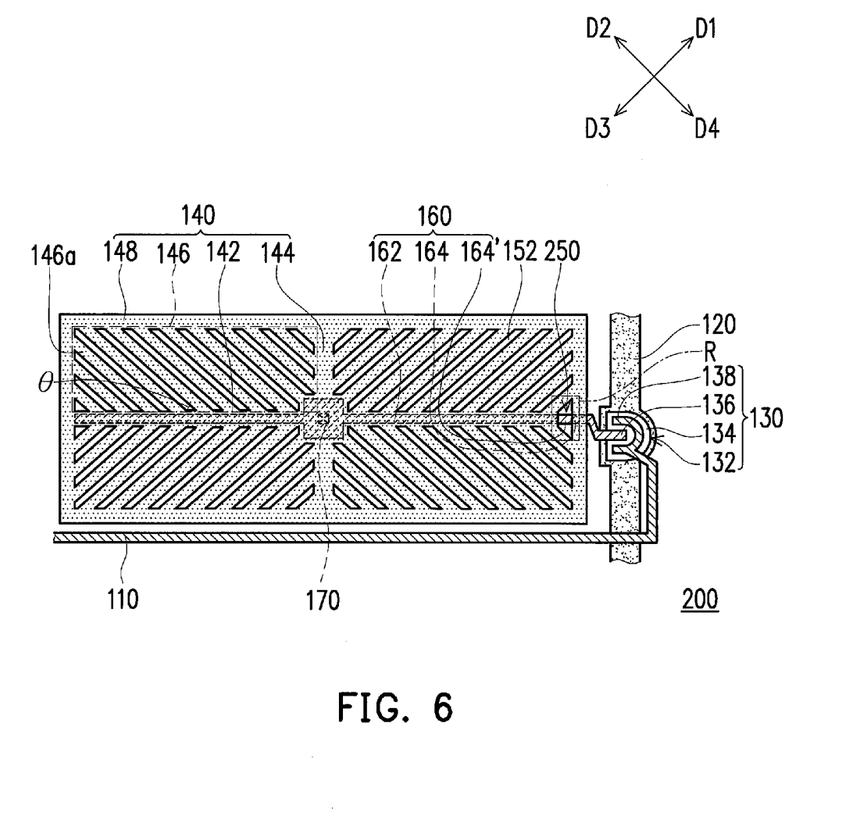
FIG. 6 is a schematic top view illustrating a pixel structure according to a second embodiment of the invention.
Figure 7:
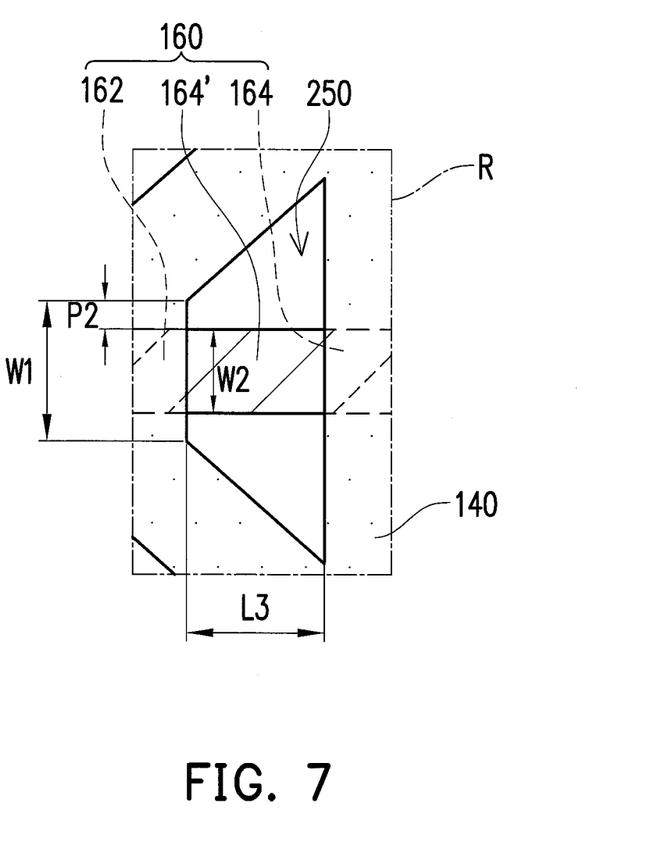
FIG. 7 is an enlarged view schematically illustrating an area R depicted in FIG. 6.

FIG. 6 is a schematic top view illustrating a pixel structure 200 according to a second embodiment of the invention, and FIG. 7 is an enlarged view schematically illustrating an area R depicted in FIG. 6. With reference to FIG. 6 and FIG. 7, the embodiment shown herein is similar to the embodiment shown in FIG. 1, so that identical components in these figures will be denoted by the same numerals and will not be reiterated herein. The difference between the embodiment shown in FIG. 6 and the embodiment shown in FIG. 1 rests in that the opening 250 at the edge of the pixel electrode 140 adjacent to the scan line 120 is a close-ended opening, and the first portion 162 and the second portion 164 of the metal line 160 are parallel to each other. Here, the second portion 164 (e.g., the metal line segment 164') is partially exposed by the opening 250. However, the invention is not limited thereto, and in another embodiment, the opening 250 may be adjacent to at least one of the data line 110 and the scan line 120. For instance, the opening 250 may be adjacent to the data line 110 or adjacent to both the data line 110 and the scan line 120. It should be mentioned that the minimum width W1 of the close-ended opening 250 is greater than a width W2 of the metal line 160, and a length L3 of the metal line segment 164' exposed by the close-ended opening 250 is at least 3 μm and is less than 10 μm; preferably, the length L3 is at least 5 μm and is less than 10 μm. The shortest distance P2 from the close-ended opening 250 to an edge of the metal line segment 164' exposed by the opening 250 is at least greater than 2 In the event that the minimum width W2, the length L3, or the shortest distance P2 is excessively short, the problem of disclination lines may still occur. By contrast, on the condition that the minimum width W2, the length L3, or the shortest distance P2 is excessively long, the transmission area is reduced, such that the aperture ratio is lowered down. Hence, the appropriate minimum width W1, the well set length L3, and the properly determined shortest distance P2 between the edge of the opening 150 and the metal line 164 prevent the problem of disclination lines from occurring at the edge of the pixel electrode 140, improve the transmittance, and ameliorate the display quality.

The embodiments shown in FIG. 6 to FIG. 7 provide several exemplary shapes of the close-ended opening 250 at the edge of the pixel electrode 140, which should however not be construed as limitations to the invention. In other embodiments of the invention, the close-ended opening 250 may be shaped in a different manner. As long as the opening 250 is able to expose the portion of the metal line 160 extending to the edge of the pixel electrode 140 adjacent to at least one of the scan line 120 and the data line 110, and the minimum width W1, the length L3, and the shortest distance P2 are properly determined, the opening does not go beyond the scope of the invention.

Figure 8:
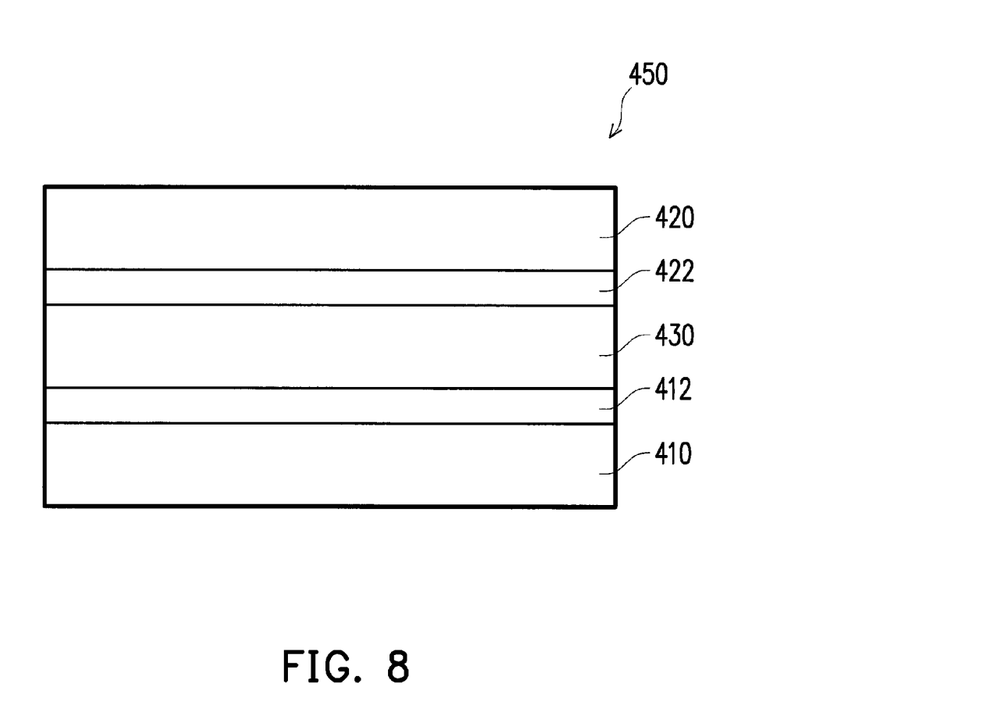
FIG. 8 is a schematic cross-sectional view illustrating an LCD panel according to an embodiment of the invention.

FIG. 8 is a schematic cross-sectional view illustrating an LCD panel according to an embodiment of the invention. The LCD panel 450 includes a first substrate 410, a second substrate 420, and a liquid crystal material 430 sandwiched between the first and the second substrates 410 and 420.

The first substrate 410 may be made of glass, quartz, organic polymer, metal, and so forth. A pixel array layer 412 is located on the first substrate 100 and constituted by a plurality of pixel structures. Each of the pixel structures is exemplified above as shown in any of FIG. 1, FIG. 2, FIG. 3, FIG. 4, FIG. 5, and FIG. 6.

The second substrate 420 is located opposite to the first substrate 410. The second substrate 420 may be made of glass, quartz, organic polymer, etc. An electrode layer 422 is located on the second substrate 420. The electrode layer 422 is a transparent conductive layer composed of metal oxide, such as indium tin oxide (ITO) or indium zinc oxide (IZO). The electrode layer 422 completely covers the second substrate 420. In an embodiment of the invention, no alignment pattern (e.g., alignment protrusion or alignment slit) is placed on the electrode layer 422. Besides, in another embodiment of the invention, a color filter array layer (not shown) including red, green, and blue color filter patterns may be further formed on the second substrate 420. A light shielding pattern layer (not shown), which is also referred to as a black matrix, may be further placed on the second substrate 420, and the light shielding pattern layer is arranged between the patterns of the color filter array layer.

The liquid crystal material 430 includes liquid crystal molecules (not shown). Since the LCD panel 450 described in the present embodiment is a PSA LCD panel, the liquid crystal material 430 includes not only the liquid crystal molecules but also monomers (not shown). In other words, before a curing process is performed on the monomers in the LCD panel 450, the liquid crystal material 430 includes the liquid crystal molecules and the monomers. When the curing process is performed on the monomers in the LCD panel 450, the monomers are polymerized to form a polymer thin film on the surfaces of the pixel array layer 412 and the electrode layer 422. Therefore, after the curing process is performed on the monomers in the LCD panel 450, the liquid crystal material 430 is mainly comprised of the liquid crystal molecules.

In addition, note that the pixel structure depicted in FIG. 1 to FIG. 6 and described herein has an opening (either the open-ended opening 150 or the close-ended opening 250) at the edge of the pixel electrode adjacent to adjacent to at least one of the scan line 120 and the data line 110, the liquid crystal material 430 correspondingly arranged at the opening of each pixel structure is tilted toward the center of the pixel structure. After the curing process is performed through applying the PSA technique, the predetermined alignment effects of the liquid crystal molecules in the liquid crystal material 430 may be accomplished. Thereby, the pixel structure and the LCD panel having the pixel structure may have favorable transmittance and may not be prone to encounter the problem of disclination lines; further, satisfactory display quality may be ensured.

To sum up, in the pixel structure and the LCD panel having the same, there is an opening (either the open-ended opening or the close-ended opening) at the edge of the pixel electrode adjacent to at least one of the scan line and the data line, and the portion of the metal layer extending to the edge of the pixel electrode is exposed by the opening. Hence, the liquid crystal material correspondingly arranged at the opening of each of the pixel structures is not tilted toward the edge of the pixel structure. That is, in an embodiment of the invention, the liquid crystal material correspondingly arranged at the opening of each of the pixel structures is tilted toward the center of the pixel structure; thereby, the transmittance of the pixel structure is favorable, the issue of disclination lines is not apt to occur, and satisfactory display quality may be guaranteed.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A pixel structure comprising:
   a data line and a scan line;
   at least one active device electrically connected to the scan line and the data line;
   a pixel electrode electrically connected to the at least one active device, the pixel electrode having an opening at an edge of the pixel electrode adjacent to at least one of the data line and the scan line; and
   a metal line located below the pixel electrode, wherein a portion of the metal line extending to the edge of the pixel electrode is exposed by the opening, and a shortest distance between an edge of the opening of the pixel electrode and the metal line is greater than or substantially equal to 3 μm.

2. The pixel structure as recited in claim 1, wherein the shortest distance is greater than or substantially equal to 5 μm.

3. The pixel structure as recited in claim 1, wherein the shortest distance is less than 10 μm.

4. The pixel structure as recited in claim 1, wherein the pixel electrode comprises:
   a main portion; and
   a plurality of branch sets extending outwardly from the main portion, wherein an included angle between the main portion and each of the branch sets is not equal to 90 degrees.

5. The pixel structure as recited in claim 4, wherein the metal line comprises a first portion and a second portion, the first portion is correspondingly located below the main portion of the pixel electrode, and the second portion is correspondingly located at the opening of the pixel electrode.

6. The pixel structure as recited in claim 5, wherein the first portion and the second portion are perpendicular to each other, and the opening is an open-ended opening.

7. The pixel structure as recited in claim 4, wherein the metal line is electrically connected to the at least one active device and the pixel electrode.

8. The pixel structure as recited in claim 7, further comprising a contact window located at the main portion of the pixel electrode, such that the contact window is electrically connected to the metal line and the pixel electrode.

9. A liquid crystal display panel comprising:
   a first substrate having a plurality of pixel structures, wherein each of the pixel structures is as recited in claim 1;
   a second substrate located opposite to the first substrate; and
   a liquid crystal material located between the first substrate and the second substrate, wherein the liquid crystal material correspondingly placed at the opening of each of the pixel structures is tilted toward a center of the pixel structure.

10. A pixel structure comprising:
    a data line and a scan line;
    at least one active device electrically connected to the scan line and the data line;
    a pixel electrode electrically connected to the at least one active device, the pixel electrode having a close-ended opening at an edge of the pixel electrode adjacent to at least one of the data line and the scan line; and
    a metal line located below the pixel electrode, wherein a portion of the metal line extending to the edge of the pixel electrode is exposed by the close-ended opening, a width of the close-ended opening is greater than a width of the metal line, and a length of the portion of the metal line exposed by the close-ended opening is at least 3 μm.

11. The pixel structure as recited in claim 10, wherein a distance from an edge of the metal line to the close-ended opening is at least greater than 2 μm, and the length of the portion of the metal line exposed by the close-ended opening is at least 5 μm.

12. The pixel structure as recited in claim 11, wherein the length of the portion of the metal line exposed by the close-ended opening is less than 10 μm.

13. The pixel structure as recited in claim 10, wherein the pixel electrode comprises:

a main portion; and a plurality of branch sets extending outwardly from the main portion, wherein an included angle between the main portion and each of the branch sets is not equal to 90 degrees.

14. The pixel structure as recited in claim 13, wherein the metal line comprises a first portion and a second portion, the first portion is correspondingly located below the main portion of the pixel electrode, and the second portion is correspondingly located at the opening of the pixel electrode.

15. The pixel structure as recited in claim 14, wherein the first portion and the second portion are parallel to each other.

16. The pixel structure as recited in claim 13, wherein the metal line is electrically connected to the at least one active device and the pixel electrode.

17. The pixel structure as recited in claim 16, further comprising a contact window located at the main portion of the pixel electrode, such that the contact window is electrically connected to the metal line and the pixel electrode.

18. A liquid crystal display panel comprising:

a first substrate having a plurality of pixel structures, wherein each of the pixel structures is as recited in claim 10;

a second substrate located opposite to the first substrate; and a liquid crystal material located between the first substrate and the second substrate, wherein the liquid crystal material correspondingly placed at the opening of each of the pixel structures is tilted toward a center of the pixel structure.

* * * * *